United States Patent [19]

Voorhees et al.

[11] Patent Number: 4,573,354
[45] Date of Patent: Mar. 4, 1986

[54] APPARATUS AND METHOD FOR GEOCHEMICAL PROSPECTING

[75] Inventors: Kent J. Voorhees, Golden; Ronald W. Klusman, Evergreen, both of Colo.

[73] Assignee: Colorado School of Mines, Golden, Colo.

[21] Appl. No.: 640,671

[22] Filed: Aug. 13, 1984

Related U.S. Application Data

[63] Continuation-in-part of Ser. No. 420,362, Sep. 20, 1982, abandoned.

[51] Int. Cl.⁴ .............................................. G01V 9/00
[52] U.S. Cl. ............................... 73/432 R; 73/863.21; 364/420; 364/498; 436/25; 436/26; 436/29
[58] Field of Search ........... 73/432 R, 863.21, 863.31, 73/23; 436/28, 29, 25, 26; 364/420, 421, 422, 496, 497, 498, 499

[56] References Cited

U.S. PATENT DOCUMENTS

| | | | |
|---|---|---|---|
| 2,266,556 | 12/1941 | Kelly | 436/29 |
| 2,284,147 | 5/1942 | Herrick | 436/29 |
| 3,180,983 | 4/1965 | Hall, Jr. et al. | 436/29 X |
| 3,734,489 | 5/1973 | Milly | 436/29 X |
| 3,768,302 | 10/1973 | Barringer | 436/25 X |
| 3,896,312 | 7/1975 | Brown et al. | 364/497 X |
| 4,008,388 | 2/1977 | McLafferty et al. | 364/498 |
| 4,267,572 | 5/1981 | Witte | 364/498 |
| 4,463,096 | 7/1984 | Hughes | 436/29 |

FOREIGN PATENT DOCUMENTS

| | | | |
|---|---|---|---|
| 112636 | 3/1941 | Australia | 436/25 |
| 694824 | 11/1979 | U.S.S.R. | 73/432 R |
| 894658 | 12/1981 | U.S.S.R. | 73/432 R |

OTHER PUBLICATIONS

*Cluster Analysis for Applications;* Chapter 1 "The Broad View of Cluster Analysis" pp. 1-9; Michael R. Anderberg; 1973.
*Chemical Applications of Pattern Recognition;* pp. 1-12; Peter C. Jurs et al.; 1975.
*Clustering Algorithms;* pp. 1-26; John A. Hartigan; 1975.
*Methods for Statistical Data Analysis of Multivariate Observations;* pp. 1-4 and 82; R. Gnanadesikan; 1977.
*Introduction to Bivariate and Multivariate Analysis,* pp. 1, and 196-203; Richard H. Lindeman et al.; 1980.

*Primary Examiner*—Stewart J. Levy
*Assistant Examiner*—Tom Noland
*Attorney, Agent, or Firm*—J. Winslow Young

[57] ABSTRACT

An apparatus and method for detecting and mapping volatile species emanating from an underground source. A mass spectrometer is used for species identification and multivariate statistics are employed to determine the character of the source. The character is quantitatively defined and the volatile species emanating from unknown areas is compared to a known source.

7 Claims, 17 Drawing Figures

FIG. 5A — TYPICAL GAS SPECTRUM

FIG. 5B — TYPICAL OIL SPECTRUM

LEGEND

▨ SIMILAR TO GAS WELL
▨ SIMILAR TO OIL WELL
● OIL WELL FOR OIL TRAINING SET
✷ GAS WELL FOR GAS TRAINING SET

APPARATUS AND METHOD FOR GEOCHEMICAL PROSPECTING

This application is a continuation-in-part application of Ser. No. 420,362 filed Sept. 20, 1982 for Apparatus and Method for Geochemical Prospecting and now abandoned.

BACKGROUND

1. Field of the Invention

The present invention relates to an apparatus and method for the discovery and definition of chemical and geochemical anomalies on the surface of the earth and in the subsurface, and more particularly, to an apparatus and method for detecting and mapping volatile substances associated with geochemical and chemical anomalies from petroleum and natural gas, metallic and non-metallic minerals, chemical wastes, and geothermal resources, wherein volatile substances from these anomalies migrate to the earth's surface.

2. The Prior Art

Historically, geochemical prospecting for petroleum and natural gas using hydrocarbons detected at the earth's surface has been based primarily on $C_1$-$C_5$ hydrocarbons with special emphasis on methane ($C_1$). In most cases, a sample of gaseous hydrocarbons from soil gas is collected via a probe driven 3 to 5 feet into the ground or, alternatively the soil gas sample is collected from a 8- to 10-foot hole in the ground and subsequently analyzed by gas chromatography. Alternatively, a hole is prepared and sealed by a packer after the sample collector has been inserted in the hole. The gas sample is collected after a suitable equilibration period. Since these samples are collected over a very short period of time they are commonly called instantaneous or "grab" samples. The high vapor pressure of volatile substances ($C_1$-$C_5$) results in their being present in a high enough concentration in the soil gas to be detected by instantaneous sampling. Volatile substances of low vapor pressure, which include most substances of high molecular weight (above $C_5$), cannot be detected by the instantaneous methods.

The individual $C_1$-$C_5$ hydrocarbons are subjectively used to define anomalies. The adsorbed compounds are chemically desorbed and analyzed for the concentration of these light hydrocarbons. The relative concentrations, and to a lesser extent, ratios of individual concentrations are used in a non-computer analysis to define anomalies.

The use of an instantaneous sample is strongly influenced by common interferences such as meteorology, soil temperature, soil type, moisture content, biological activity and other phenomena. Numerous publications cite the importance of these interferences on the measured concentrations of hydrocarbons and other gases: Representative literature references include the following:

Ryall, W. R. Guidelines for collection, preparation and storage of geochemical samples for mercury analysis. Tech. Comm.-CSIRO Inst. Earth Resources, No. 67, 17 pp., 1979.

Kraner, H. W., Measurements of the effects of atmospheric variables on the Rn-222 flux and soil gas concentration. In The Natural Radiation Environment. J. A. S. Adams, ed., U. Chicago Press, pp. 191-215, 1964.

Tanner, A. B., Radon migration in the ground. In The Natural Radiation Environment, J. A. S. Adams, ed. Univ. Chicago Press, pp. 161-190, 1964.

Tanner, A. B. Radon migration in the ground: A supplementary review. U.S. Geol. Survey, Open-file Rept. 78-1050, 62 p, 1978.

Reimer, G. M., Helium detection as a guide for uranium exploration. U.S. Geol. Survey, Open-file Rept., 76-240, 14 p., 1976.

Klusman, R. W. and Webster, J. D., Meteorological noise in crustal gas emission relevant to geochemical exploration. J. Geochem. Explor. v. 15, pp. 63-76, 1981.

Klusman, R. W., Variations in mercury and radon emission at an aseismic site. Geophys. Res. Lett., v. 8, pp. 461-464, 1981.

Ball, T. K., Nicholson, R. A., Peachey, D., Effects of meteorological variables on certain soil gases used to detect buried ore deposits. Trans., Inst. Mining, Metallurgy, London, v. 92, pp. B183-B190, 1983.

Adams, D. F., Farwell, S. O., Pack, M. R. and Robinson, E., Biogenic sulfur gas emissions from soils in eastern and southeastern United States. J. Air Pollut. Control Assoc., v. 31, pp. 1083-1089, 1981.

Blackmer, A. M., Diurnal variability in rate of emission of nitrous oxide from soils. Soil Sci. Soc. Amer. J., v. 46, pp. 937-943, 1982.

Rightmire, C. T., Seasonal variation in $P_{CO2}$ and $13_C$ content of soil atmosphere. Water Resource. Res., v. 14, pp. 691-692, 1978.

Whitehead, D. C., The volatilization, from soils and mixtures of soil components of iodine added as potassium iodide. J. Soil Sci., v. 32, pp. 97-102, 1981.

Klusman, R. W. and Landress, R. A., Secondary controls on mercury in soils of geothermal areas. J. Geochem. Explor., v. 9, pp. 75-91, 1978.

Klusman, R. W. and Landress, R. A., Mercury in soils of the Long Valley, Calif. geothermal system. J. Volcan. Geothermal Res., v. 5, pp. 49-65, 1979.

Klusman, R. W., Cowling, S., Culvey, B., Roberts, C., Schwab, A. P., Preliminary evaluation of mercury and arsenic in soils of selected Colorado geothermal districts. Geothermics, v. 6, pp. 1-8, 1977.

Trost, P. B. and Bisque, R. E., Differentiation of vaporous and ionic mercury in soils. Int. Geochem. Explor. Symp., Toronto, pp. 276-278, 1971.

Swaby, R. J., Emission of sulfur to the atmosphere from soil. Sulfur Aust. Pop., Workshop, pp. 14-19, 1978, (pub. 1980).

Ryall, W. R., Guidelines for collection, preparation and storage of geochemical samples for mercury analysis. Tech. Comm. -CSIRO Inst. Earth Resources, No. 67, 17 pp., 1979.

Klusman, R. W. and Matoske, C. P., Adsorption of mercury by soils from oil shale development areas in the Piceance Creek basin of northwestern Colorado. Environ. Sci. Technol., v. 17, pp. 251-256, 1983.

Hunt, J. M., "Petroleum Geochemistry and Geology" San Francisco, W. H. Freeman, 617 p. 1979.

To overcome the meteorologic and biologic influences on instantaneous sampling, an integrative or continuously collecting medium is sought. Soil itself has been used to integrate volatile substances in the application to petroleum exploration. Soils are complex and heterogeneous materials whose ability to retain and integrate volatile substances is highly variable. Factors such as clay mineralogy, organic matter content, pH, climate, plant cover, and other factors influence the retention capability for volatile substances. Some of these problems are addressed for a wide variety of volatile substances by various authors:

Adams, D. F., Farwell, S. O., Pack, M. R. and Robinson, E., Biogenic sulfur gas emissions from soils in eastern and southeastern United States. J. Air Pollut. Control Assoc., v. 31, pp. 1083–1089, 1981.

Blackmer, A. M., Diurnal variability in rate of emission of nitrous oxide from soils. Soil Sci. Soc. Amer. J., v. 46, pp. 937–943, 1982.

Rightmire, C. T., Season variation in $P_{CO2}$ and $13_C$ content of soil atmosphere. Water Resource. Res., v. 14, pp. 691–692, 1978.

Whitehead, D. C., The volatilization, from soils and mixtures of soil components of iodine added as potassium iodide. J. Soil Sci., v. 32, pp. 97–102, 1981.

Klusman, R. W. and Landress, R. A., Secondary controls on mercury in soils of geothermal areas. J. Geochem. Explor., v. 9, pp. 75–91, 1978.

Klusman, R. W. and Landress, R. A., Mercury in soils of the Long Valley, Calif. geothermal system. J. Volcan. Geothermal Res., v. 5, pp. 49–65, 1979.

Klusman, R. W., Cowling, S., Culvey, B., Roberts, C., Schwab, A. P., Preliminary evaluation of mercury and arsenic in soils of selected Colorado geothermal districts. Geothermics, v. 6, pp. 1–8, 1977.

Trost, P. B. and Bisque, R. E., Differentiation of vaporous and ionic mercury in soils. Int. Geochem. Explor. Symp., Toronto, pp. 276–278, 1971.

Swaby, R. J., Emission of sulfur to the atmosphere from soil. Sulfur Aust. Pop., Workshop, pp. 14–19, 1978, (pub. 1980).

Ryall, W. R., Guidelines for collection, preparation and storage of geochemical samples for mercury analysis. Tech. Comm. -CSIRO Inst. Earth Resources, No. 67, 17 pp., 1979.

The last author indicated stringent storage requirements may have to be met for soils to retain volatile substances. Another publication demonstrated the ability of a group of soils to retain volatile substances increases and decreases with season.

Klusman R. W. and Matoske, C. P., Adsorption of mercury by soils from oil shale development areas in the Piceance Creek basin of northwestern Colorado. Environ. Sci. Technol., v. 17, pp. 251–256.

To overcome the problem in using soils as an integrating medium for volatile substances, a synthetic material such as charcoal, resins, molecular sieve, or other material has been used as a collector. Charcoal has been described as a method for trapping of gases from underground petroleum accumulations (U.S. Pat. Nos. 2,266,556; 2,284,147). Appropriate containers for underground collection were described in these cases. However, no description of analysis of the trapped hydrocarbons and no description of data interpretation were presented.

Other volatile organic and inorganic substances are potentially useful in the exploration for mineral deposits and geothermal resources. The volatile substances which have been described in the literature as being useful in these applications include: sulfur gases, mercury, radon, helium, arsenic-containing gases, carbon dioxide, and halogen-containing gases, while hydrocarbons have been used to a lesser extent. The same problems associated with instantaneous methods and using soil as an integrative medium apply as well to these applications.

A wide variety of toxic and hazardous substances have been dispersed in soils and groundwater by human activities. Many of these are hydrocarbon-based or halogenated hydrocarbon-based. Most of these compounds are adsorbed by soils and have sufficient volatility to be detected by integrative collection methods. In this geologic environment, the complex interactions previously described exert their influence and make data interpretation difficult.

The detection of minute volatile hydrocarbon samples from non-geologic sources use an analytical technique based on Curie-point pyrolysis. This technique is disclosed in a publication entitled "Novel Method for the Direct Analysis of Hydrocarbons in Crime Investigations and Air Pollution Studies," J. D. Twibell, Janet M. Home, Nature, Vol. 268, 25 August 1977. In this publication, and in at least two other articles, a procedure using charcoal glued to a ferromagnetic wire is disclosed for use in conjunction with gas chromatography as the analytical technique. The procedure overcomes many of the inherent problems of desorbing the volatile substances of interest from the charcoal that all other charcoal adsorption techniques have encountered. By using a ferromagnetic wire as a support, the wire can also serve as a heater to desorb the adsorbed chemicals when placed in a high frequency electromagnetic field.

Prior to the present invention, whether the method used an instantaneous or integrative sample approach, analysis was primarily by gas chromatography and resulted in definition of anomalies where high concentrations of singular volatiles were observed. Methane has been most extensively used of all the hydrocarbons. In many cases, biogenic activity has caused increased methane concentrations which were not associated with a petroleum or thermogenic gas accumulation. Another difficulty is that areas of high volatile flux may represent zones of high permeability (i.e., faults) not necessarily related to deposits of economic interest. Volatile flux data can result in many false anomalies.

Strong warnings exist concerning the usage of the $C_1$–$C_5$ hydrocarbons in defining the boundaries of an accumulation. The primary accepted use of the described methodology is to select general areas for drilling but not to give an outline of the area encompassed by the hydrocarbon accumulation. The problems of using volatile materials and volatile materials adsorbed by soils are not trivial. The widely accepted primary textbook, in a summary on seeps and surface prospecting, states, "Vertical diffusion of hydrocarbons from subsurface petroleum accumulations is not the mechanism that causes surface hydrocarbon anomalies. These anomalies are probably caused by the diffusion of gases from decaying organic matter in the first few hundred feet of burial and by hydrocarbons migrating to the surface by mechanisms other than diffusion. Buoyancy is the most likely driving mechanism.

Surface geochemical prospecting cannot outline oil or gas accumulations at depth except in rare cases. It can be useful as an auxiliary prospecting tool providing that data on subsurface geology, near surface hydrocarbons, and fluid flow systems in the sediments is available. It is most useful where intrusions, fault or fracture systems, or permeable beds are providing vertical pathways of migration by processes other than diffusion. In such regions, it can assist in differentiating structures and areas that contain hydrocarbons from those that are barren." (Page 433)

Hunt, J. M., "Petroleum Geochemistry and Geology" San Francisco, W. H. Freeman, 617 p. 1979.

The present invention eliminates the previously described problems and presents new methodology for the collection and analysis of hydrocarbons, organics, and certain inorganic volatile species. It also provides an objective methodology for the computer interpretation of the data and the production of a unique map which outlines the boundary of the accumulation. The present invention uses an integrative sampling approach with various adsorbents which eliminates the need for correction for such parameters as soil temperature, meteorology, biologic effects, etc. This present invention also eliminates the problems of gas diffusion into the container and expands the number of hydrocarbon compounds used in the analysis from $C_1$–$C_5$ to $C_2$–$C_{18+}$. Methane is not used with the present technology. Other organic and inorganic compounds are also collected and analyzed by this invention.

Definition of the multiplicity of compounds adsorbed on the adsorbent is done by any suitable device which generates a characteristic, diagnostic, and discriminatory fingerprint. Multivariate statistics are used to objectively classify the various fingerprints. A geochemical model used as a "training set" is an important aspect of the data analysis and allows for clear definition and characterization of underground accumulations. Finally, unique maps are produced which show a quantitative similarity of a sample set to the characteristic geochemical model.

PRIOR ART STATEMENT

U.S. Pat. No. 2,266,556 to Kelly disclosed using activated charcoal to trap vapors rising to the surface from underground oil deposits. A deep hole was required with this device.

U.S. Pat. No. 2,284,147 to Herrick describes a device to trap gases which are present in a well borehole.

U.S. Pat. No. 2,345,219 to Sanderson describes a trapping device which could be used in 8- to 10-foot deep holes to collect soil gases.

U.S. Pat. No. 3,987,677 to Alter described a method for collecting geochemical gases from minerals at the surface. In all cases gases migrate into a container where they are trapped on a suitable collector.

BRIEF SUMMARY AND OBJECTS OF THE INVENTION

The present invention relates to a method and apparatus for collecting, statistically analyzing, and mapping data representing trace amounts of a plurality of trace, volatile compounds. These trace compounds are collected just below the soil surface over an integrative period of time (varying from 1 to 20 days), such period being determined by prior experience in the exercise of this method. The collection device embodies a suitable adsorbent mounted on a ferromagnetic wire support. Analysis is accomplished by introducing the device into a mass spectrometer. The plurality of trace compounds are desorbed by imposing an electromagnetic field on the wire.

Multivariate statistics are employed to compare the plurality of trace compounds from one integrative collector to the plurality of trace compounds from another. Similar groupings of trace compounds ("fingerprints") can be demonstrated by this method to be related to the same or similar buried chemical or geochemical anomaly.

Multiple collection locations are selectively spaced to provide for comparison of similar groupings of trace compounds over the preselected geographic area. The spacing of collection locations is determined by prior experience in the exercise of this method and can vary from several feet to several miles.

Maps are prepared from the information obtained and have been demonstrated to be useful in locating and defining buried chemical and geochemical anomalies. Definition of the chemical nature of the buried anomaly is achieved by developing a chemical signature or fingerprint of the volatile compound or plurality of trace volatile compounds that originate and emanate from the buried anomaly.

Surveys conducted over selected geology with known and with subsequently proven and defined anomalies have demonstrated that the plurality of compounds collected and measured experience strong vertical migration with minimal lateral migration. This vertical migration phenomena permits useful definition of buried anomalies from the data collected just below the soil-atmosphere interface.

It is, therefore, a primary object of this invention to provide improvements in apparatus for conducting geochemical prospecting for gases associated with or produced by an underground deposit wherein those gases migrate to the surface of the earth.

Another object of this invention is to provide improvements in the method of geochemical prospecting for gases associated with or produced by underground deposits wherein those gases migrate to the surface of the earth.

Another object of this invention is to provide a novel sampling technique whereby a suitable adsorbent is bonded to a ferromagnetic wire and is used as a sample collector for adsorbing gases trapped by a container inverted over the sample collector.

These and other objects and features of the present invention will become more fully apparent from the following description and appended claims taken in conjunction with the accompanying drawing.

DETAILED DESCRIPTION OF THE PREFERRED EMBODIMENTS

The invention and process are best understood by reference to the drawing which illustrates the devices, processes and demonstration of results taken in conjunction with the accompanying description and appended claims.

GENERAL DISCUSSION

Ferromagnetic wires approximately four inches in length and approximately 0.005 inches in diameter are prepared for use as integrative collectors of volatile substances. Variations in length and diameter are not critical and may be modified to fit the inlet portion of the analytical systems. The composition of the wire is important in determining the temperature to which it is heated by inductive means. Presently available ferromagnetic alloys allow heating temperatures in the range of 300° to over 910° C.

The wire is prepared for coating with adsorbent by roughening an end of the wire with emery cloth. The wire is coated with a suitable inorganic cement with a binder capable of retaining its integrity during moderate abrasion and exposure to water vapor and/or water. The cement and/or binder must not be a source of interference or contamination of the volatile substances collected by the adsorbent or during thermal desorption. The adsorbent is placed on the end of the wire as a thin, uniform coating when the binder is in the right physical state for proper adherence. The adsorbent may be activated charcoal, molecular sieve or other synthetic adsorbent material, or a combination of adsorbents. It may be necessary for the coated wire to dry or cure for a suitable length of time.

The adsorber is activated to drive off residual volatile substances which may be done by heat, vacuum, other desorption techniques, or combinations of processes.

In the activated or cleaned state, it is ready for placement in the field and is transferred to a suitable container via an inert atmosphere. The container must not contaminate the activated wire and must be composed of an inert material which does not emanate volatile substances. Materials such as glass, metal, teflon are typically used although there may be other suitable materials. The container is cleaned by thorough washing with water, solvent or other material capable of removing residual films, followed by baking at a suitable temperature.

DETAILED DESCRIPTION

Figures 1, 2:
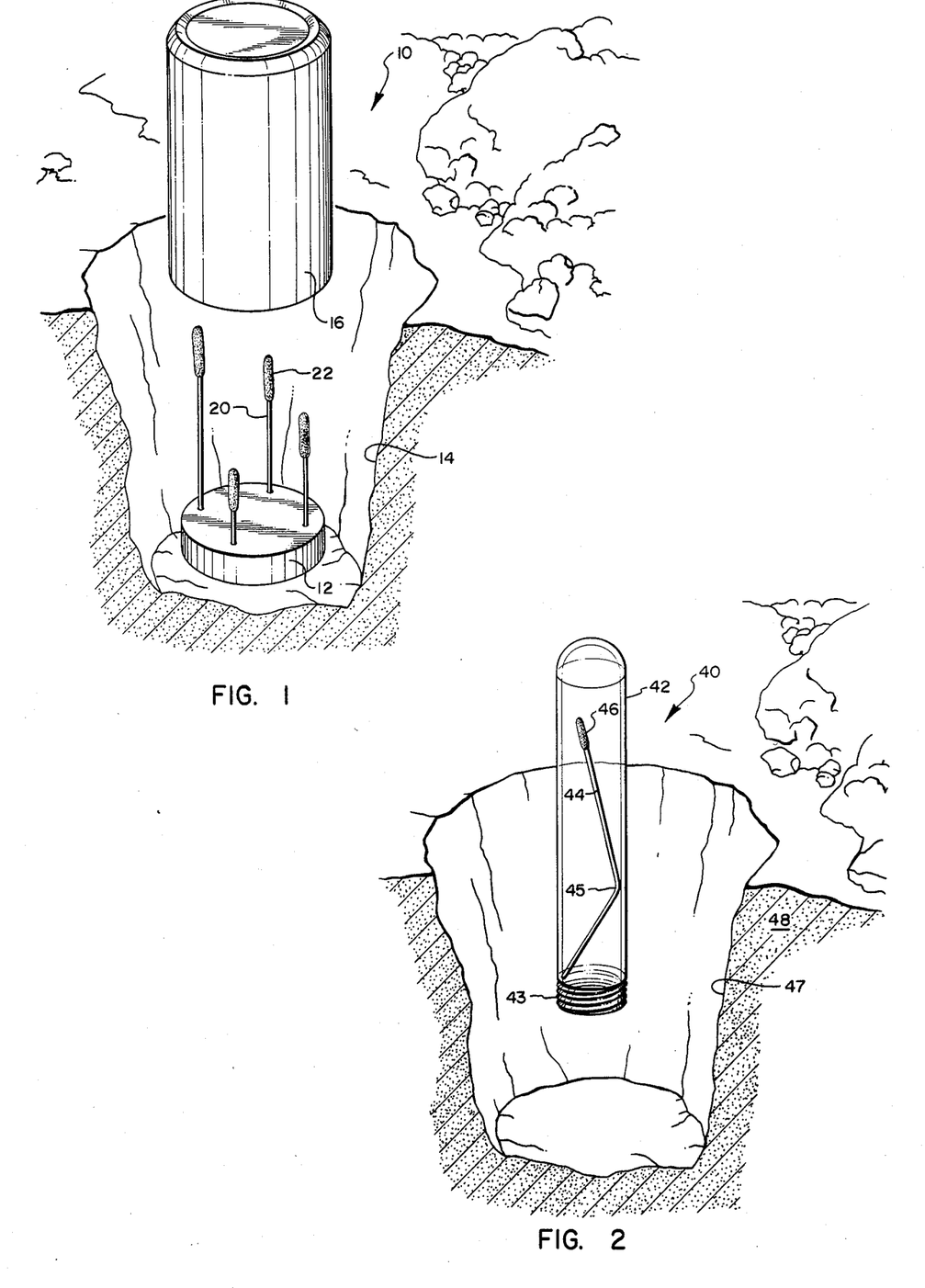
FIG. 1 is a perspective view of one embodiment of the integrative sample collector and container apparatus of this invention shown in the environment of a shallow hole in the earth.
FIG. 2 is a perspective view of a second alternative embodiment of the integrative sample collector and container apparatus of this invention shown in the environment of a shallow hole in the earth.

FIG. 1 illustrates one version of the integrative collector apparatus 10 as it is prepared for placement into the ground. A shallow hole 14 is dug in the soil and a pedestal 12 is placed in the bottom of hole 14. The only function of pedestal 12 is to support wire 20 in a vertical position with adsorbent 22 in spaced relationship to can 16 and the soil of hole 14. Pedestal 12 must be of a non-contaminating material such as metal. In various versions of this embodiment, a milled block of aluminum with holes drilled in it can be used to support one or more wires. In another version, small, cleaned pieces of aluminum foil (not shown) are folded to form a base for wire 20. Wire 20 is removed from its container and placed in pedestal 12 without touching by use of a tweezer or other suitable device.

Wire 20 in its pedestal 12 is covered by placing an inverted, seamless aluminum can 16 over the assembly. Aluminum can 16 is obtained by being removed from the manufacturing process prior to the top being placed thereon and, more importantly, prior to it being printed, coated, or otherwise labeled as these materials might interfere with the subsequent collection or desorption of the volatile substances. Aluminum can 16 is covered with soil and suitable markings and/or field notes are made to insure the location can be found again.

FIG. 2 illustrates another version of the integrative collector apparatus shown at 40. In this version, a container 42 is used both for transportation and as the cover for a ferromagnetic wire 44 having an adsorbent 46 bonded thereto. After activation of adsorbent 46 on wire 44, wire 44 is bent slightly at bend 45 prior to transfer to transportation container 42. Wire 44 is held in container 42 by bend 45 its own natural rigidity and will not fall out of the tube when container 42 is placed in an inverted position in hole 47 in the ground 48. In this embodiment, container 42 is a pyrex glass culture tube approximately six inches long and one inch in diameter with a teflon-lined cap (not shown) received on threads 43. Wire 44 is transferred via an inert atmosphere in container 42.

Container 42 is cleaned as previously described and teflon tape (not shown) is wrapped around the threads 43. The individual wires 44 are transported in their individual containers 42 as previously described (FIG. 1). A shallow hole 47 is dug or augered in ground 48, the teflon-lined cap (not shown) removed and container 42 with wire 44 is inverted directly into hole 47. In this embodiment, no pedestal is needed and field personnel do not handle the ferromagnetic wire directly. The cap (not shown) is retained in a clean environment for replacement on tube 42 upon retrieval. Threads 43 can be cleaned by using a clean rag and/or removing the teflon tape (not shown) placed on tube 42 prior to insertion of wire 44. Marking for retrieval from the field is as previously described.

Figure 3:
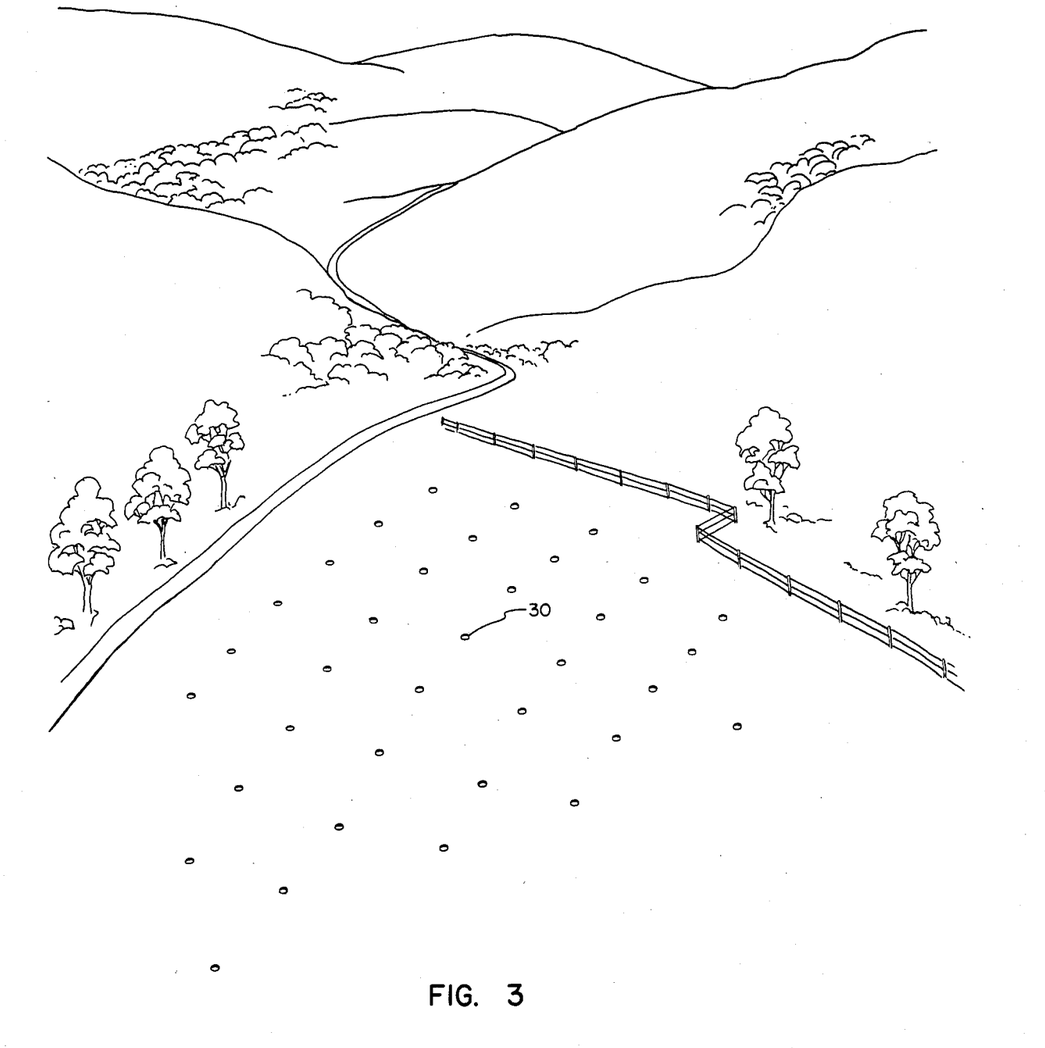
FIG. 3 is a schematic representation of one possible shallow hole pattern for layout of the shallow holes dug for placement of the sample collector and container shown in FIGS. 1 and 2.

Referring to FIG. 3, a plurality of shallow holes 30 containing integrative sample collectors therein is illustrated schematically as having a predetermined pattern, in this instance a grid pattern. Other suitable patterns can be used for the purpose of obtaining the data required for the suitable application of this invention. Other patterns could include, for example, shallow holes in rectangular grids, triangular grids, random patterns at a predetermined sample density, and lines or linear patterns across or parallel to geologic formations or geologic features of interest. Sample spacing is best determined by individuals experienced in the practice of the art and tempered by the objectives of the study. For example, in reconnaissance surveys, areas as large as thousands of square miles might be studied using a few hundred samples. At the other extreme, sample spacings of only a few feet may be appropriate in order to resolve a particularly small feature of interest.

The sample locations are marked, surveyed, or described by suitable field notes so that they may be found again by field personnel. Integrative collectors are typicaly left in place one to 20 days. The optimum period of collection is determined by the application and location, and by those experienced in the practice of the method.

The ferromagnetic wire collectors are retrieved, sealed in transportation containers (not shown) in the case of the embodiment described in FIG. 1 or capped as in the embodiment of FIG. 2. The containers are labeled so the field location is known for later plotting as a map. Transportation back to the laboratory is the same as to the field.

Samples are separated into groups of duplicates, training sets, regular survey samples. The duplicates can be used to calibrate, adjust sensitivity, and tune the analytical instrumentation as well as check reproducibility. The training set sample wires are used to develop the geochemical model from which the pattern recognition procedure is carried out.

The wires are thermally desorbed into a detector such as a mass spectrometer or gas chromatograph. In one case, a ferromagnetic wire was used to support the charcoal adsorbent and was heated inside a mass spectrometer by inducing high electromagnetic frequency energy into the wire (Curie-point process). The mass spectrometer was scanned about 40 times to produce a mass spectrum which served as a fingerprint of the adsorbed materials. The spectra from the mass spectrometer was transferred directly to and stored on computer disk.

The interpretation of the data begins by normalizing the spectra from the entire sample suite from a survey. The spectra are normalized by calculating each peak as a percentage of the largest peak in an individual spectrum or calculating each peak as a percentage of the sum of all peak intensities. This process allows one spectrum to be directly compared to another spectrum. These can be computer plotted and will be illustrated later. Multivariate statistics including cluster analysis and supervised learning are applied to the spectra. In the case of supervised learning, a set of samples are collected to represent a desired property such as an oil production zone. This group is commonly termed a "training set." In general, as is well known, a training set is a set of different characteristics. Each characteristic in the set used is an average of a number of determinations of that particular characteristic. The average is taken to help cut down the effect of random errors in measurement. For this reason this average set of a number of training sets is referred to as the "center" of the training set. Hereafter "the training set" means this average set. Different determinations will result in the establishment of different training sets which can also then be used independently. The samples are desorbed, separated by mass, and a characteristic spectrum fingerprint is developed.

The fingerprint represents a plurality of volatile compounds emanated from a source below the integrative sample collector. This set of fingerprints is used as a geochemical model with the survey samples being statistically compared against the training set. From this calculation, a distance in multidimensional space is measured from the center of the training set to each individual sample in the test data. The distance can be used directly as an indication of similarity or inverted to a parameter called the "similarity value." A sample with a high similarity value represents a sample with a fingerprint very similar to the training set. The similarity value is a quantitative comparison with the training set. The similarity value will be the primary parameter used in developing maps for geologic interpretation.

The mapping process begins by digitizing the X and Y coordinates of each sample point in a survey. This is commonly done on a large computerized digitizer. The computer keeps track of the location of a movable cursor on the table surface to which a sample location map is attached. The crosshairs of the cursor are positioned over a sample point. The sample number is entered by a keypad on the cursor and the computer records the X and Y position as well as the sample number. Each sample point is digitized in turn and stored on the computer or on the disk.

A separate computer program is used to compute the latitude and longitude of the samples relative to Greenwich or as X and Y distance relative to a known base point or origin. The program can operate utilizing sample maps at any scale. Another computer program takes the similarity value file, the X-Y coordinate file and the mass spectral file and merges them together by sample number.

Figure 4:
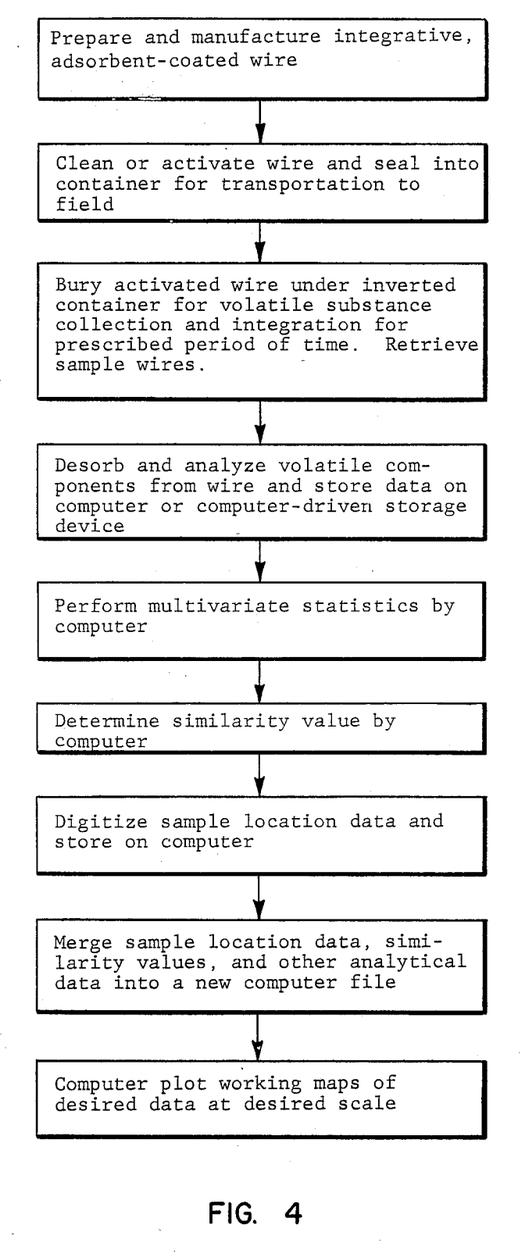
FIG. 4 is a flow diagram of the process whereby the maps of similarity values are generated for geologic interpretation.

As a final step in the process, the merged data file is plotted on a map by computer at some desired scale. The desired boundaries of the map are determined either as latitude-longitude or as distance in feet or meters from the desired origin. The sample data are plotted within these map boundaries. Maps may be generated showing sample locations, similarity values at the proper X-Y location, or any component of the mass spectral data or other analytical data plotted at the proper X-Y location. These computer-plotter drawn maps serve as working copies for geologic interpretation. FIG. 4 provides a flow diagram of the entire process from wire manufacture to mapping of sample data.

Subsequent figures will be presented and described, demonstrating how the present invention overcomes the problems described earlier. Some of the figures have been developed into finished, interpreted maps from the computer-plotter drawn working maps.

Figure 5A:
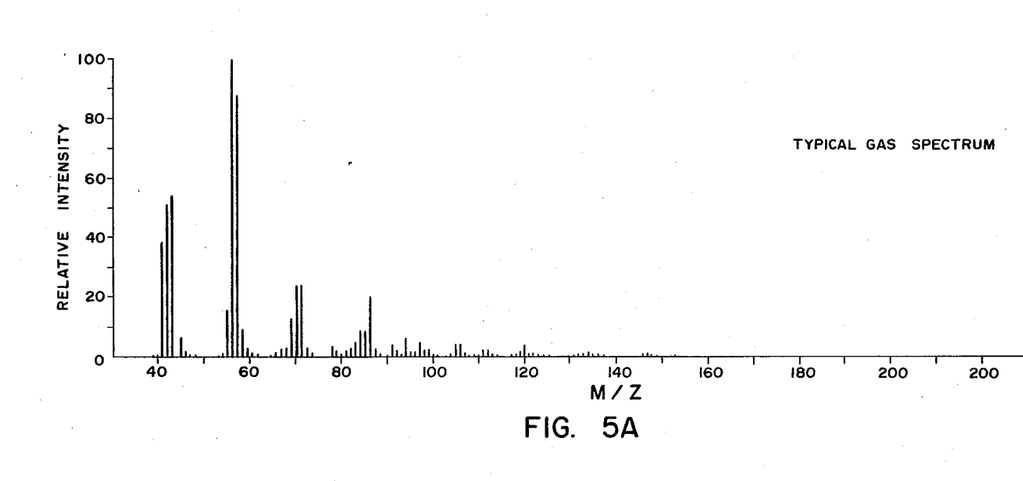
FIGS. 5a and 5b illustrate mass spectra of volatile substances collected by the integrative sample collector shown in FIGS. 1 and 2.
Figure 5B:
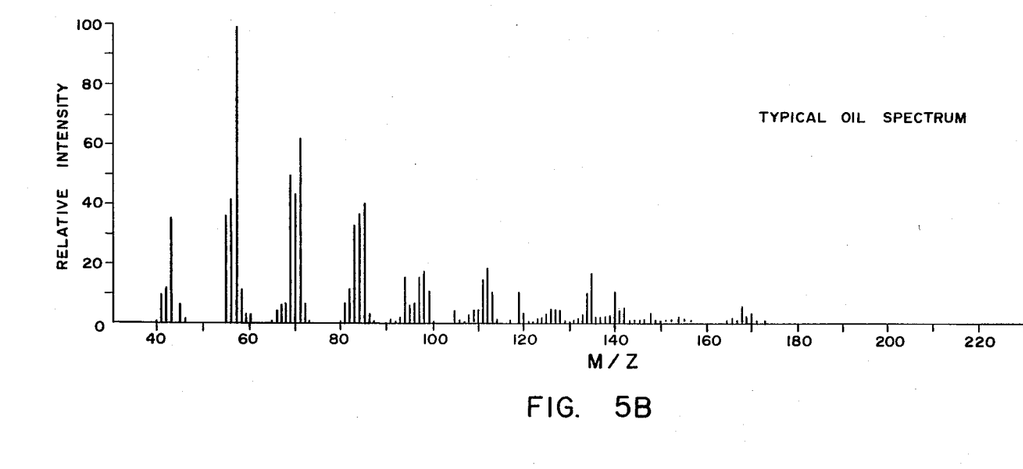

FIGS. 5a and 5b are mass spectra resulting from the analysis of two different sample locations in the same survey. The samples in this and all subsequent examples were collected using the previously described integrative collector device and method. Each line represents a compound or fragment of a volatile compound. They are plotted as M/Z, which is representative of the mass of the compound or fragment. The mass is plotted versus the relative intensity with the strongest peak normalized to 100 as previously described. This allows FIGS. 5a and 5b to be directly compared. The sample represented by FIG. 5a was taken adjacent a gas well with the producing zone at a depth of 2,000 feet. FIG. 5b is adjacent a producing oil well with production at a depth of 6,000 feet. There are visual differences but these differences are not readily quantified although they can be quantified by using the supervised learning procedure on several samples from around the gas well and oil well.

The area of interest is surveyed simultaneously with the described collector using the appropriate sample spacing. The survey data are analyzed and a similarity value computed for the samples relative to the gas well training set and the oil well training set. These constitute distinct geochemical models. The areas of high similarity to gas production and high similarity to oil production are plotted by the described mapping procedure and superimposed.

Figure 6:
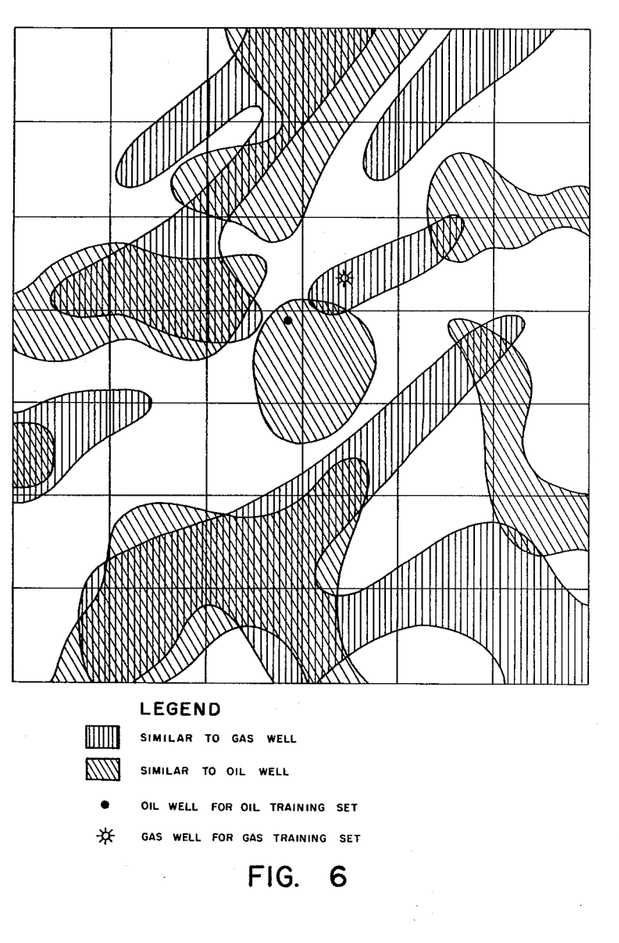
FIG. 6 is a map of areas of high similarity to either natural gas or petroleum in the subsurface as shown in the mass spectra of FIGS. 5a and 5b.

FIG. 6 demonstrates in map form the discrimination afforded by the respective fingerprints. The survey area is clearly separated into areas characteristic of oil-like emanations, gas-like emanations, both, or neither. Additional wells drilled in oil-similar areas in the southern portion of the survey have confirmed the presence of petroleum.

Figure 7:
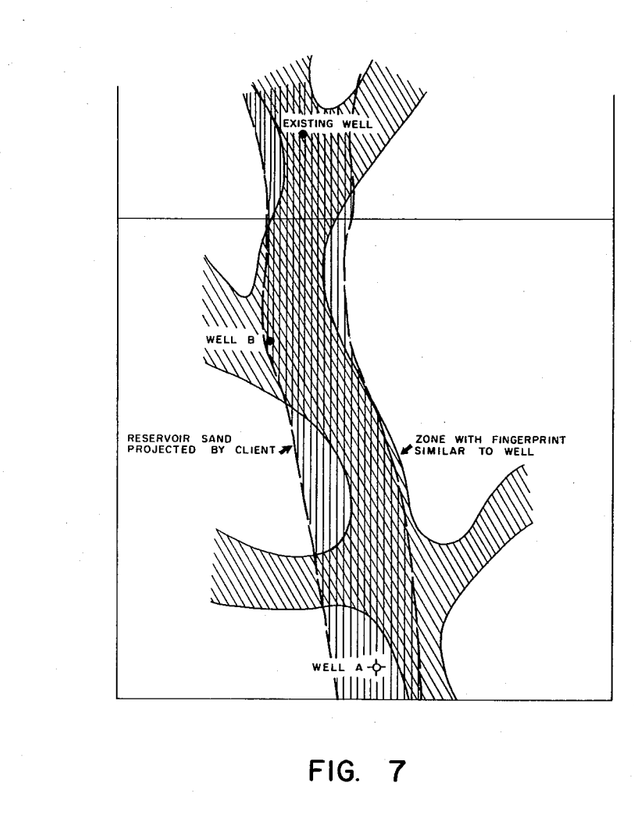
FIG. 7 is a map of areas of high similarity to petroleum in the subsurface as reservoired in a channel sand.

FIG. 7 is a map which demonstrates the resolution attainable by the invention and that vertical migration does indeed occur. A petroleum reservoir sand was hypothesized to exist and followed the trend shown on the map. The described collectors were placed in the area of interest and around the existing well (production at a depth of 2,000 feet) retrieved, and analyzed. Those around the existing well were used as a training set to develop a fingerprint or geochemical model for the emanations. A zone with a similar fingerprint was mapped, generally following that hypothesized by the client.

A well was drilled to intersect the similar zone, but measurements of deviation from vertical placed the bottom-hole location at Well A which missed the similar zone and the well was dry. Another well was drilled at location Well B where the target was wider and is a producing well. The definition of the channel is quite apparent from data and confirmed by drilling.

Figure 8:
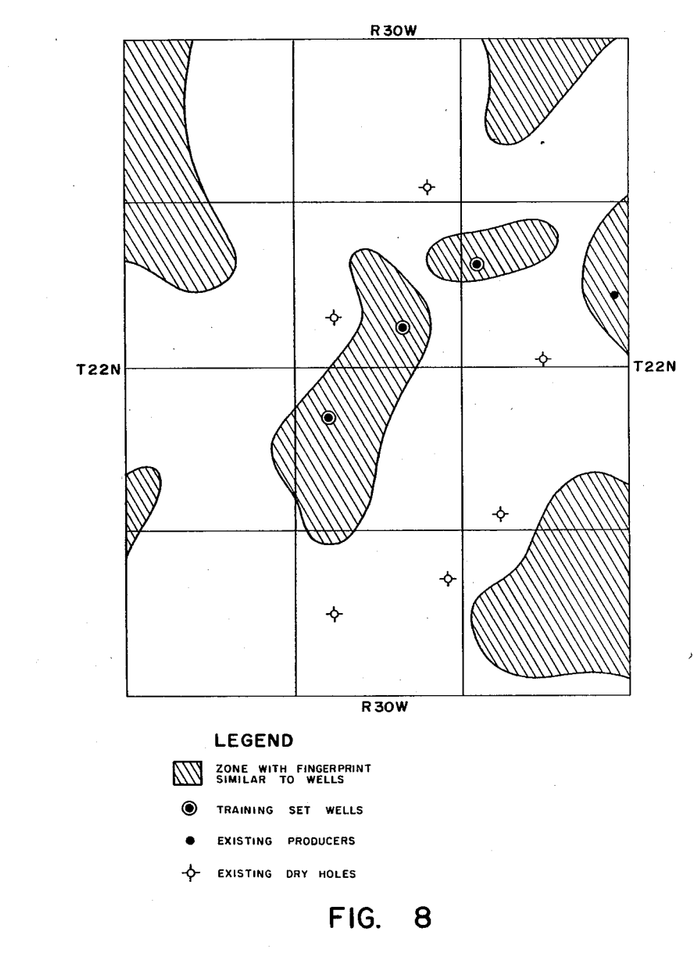
FIG. 8 is a map of areas of high similarity to petroleum in the subsurface as reservoired in a reef structure.

FIG. 8 also demonstrates resolution and vertical migration. Production is from reef structures at a depth of 6,500 feet. Collectors were placed around three wells to develop training sets as well as the surrounding area of interest. The similarity value data suggested the reef structure was divisible into two segments. This separation could not be resolved using seismic data. A well was subsequently drilled between the structures and would not produce petroleum but was only a "show."

Faults and fractures provide conduits of leakage of volatile substances toward the surface. Much of the criticism of gas techniques concerns the high fluxes of gases commonly observed in these areas. They readily identify zones of high permeability but not necessarily accumulations of economic interest and can be misleading in exploration applications. The present invention has the ability to identify the high permeability zones associated with faults and fractures without relying on the total volatile flux as an indicator.

Figure 9A:
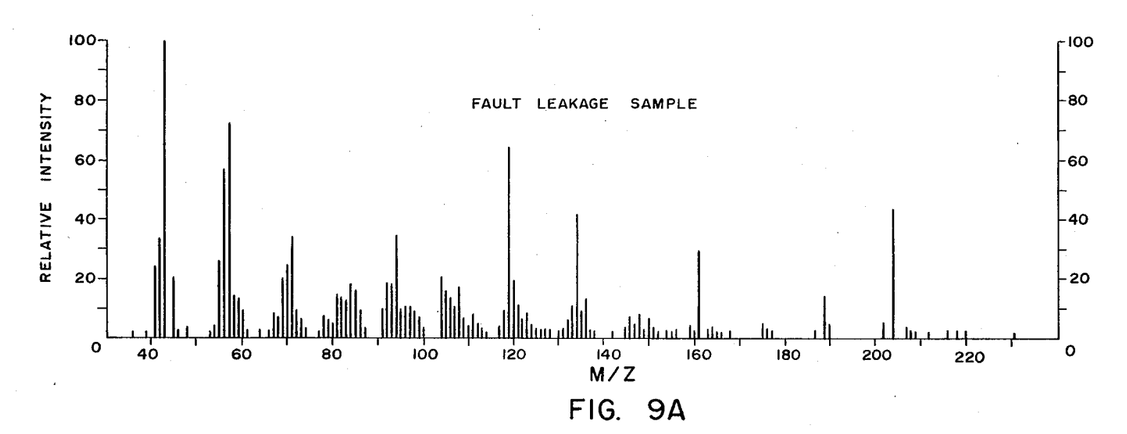
FIGS. 9a and 9b illustrate mass spectra of volatile substances collected by the integrative sample collector shown in FIGS. 1 and 2.
Figure 9B:
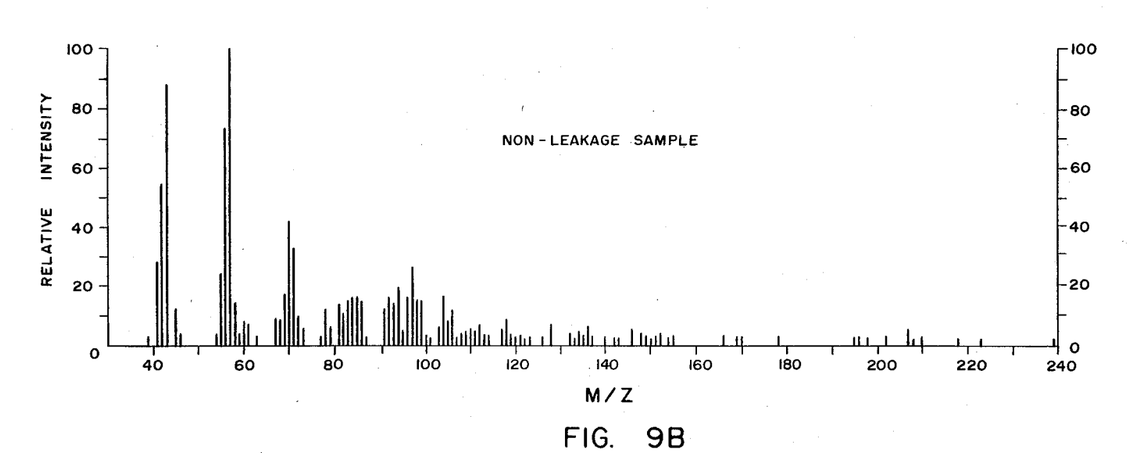

FIGS. 9a and 9b are mass spectra of volatile samples collected by the present invention at adjacent sample sites. The sample represented by FIG. 9a is collected over a high permeability zone and FIG. 9b from an area of much lower permeability. The relative intensity plots indicate volatile species of molecular weight (M/Z) greater than 120 are present in significant amounts. The low intensity peaks of similar height on FIG. 9b represent background on an instrument operating at high sensitivity and are commonly termed "grass." The spectrum of FIG. 9a is that characteristic of fault leakage and is definitive for that feature. It is not necessary to know the total volatile flux to make this determination.

Figure 10:
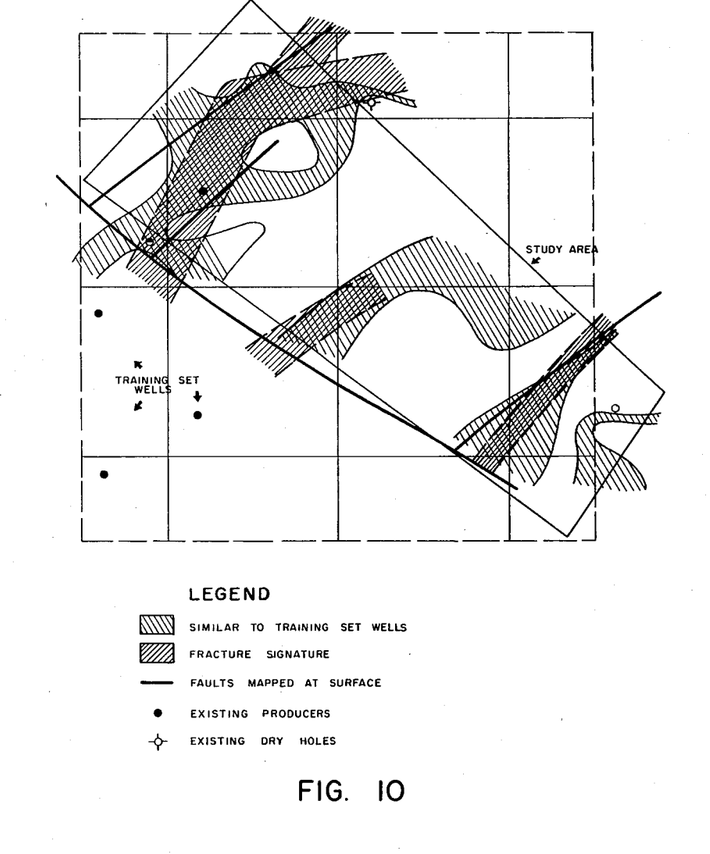
FIG. 10 is a map of areas of high similarity to petroleum in the subsurface as reservoired in fractures and superimposed is an overlay of areas of characteristic fault/fracture leakage.

It is possible to use this information to explore for fault/fracture types of petroleum reservoirs. In this situation, a training set of samples around an existing well is used to characterize and develop a fingerprint. The area of interest is sampled using the present invention and the similarity value calculated and mapped. A second map is developed which portrays the fault/fracture signature and the maps overlayed. FIG. 10 is a composite map of this application. The drilling targets are selected at locations that have both high similarity value and fault/fracture signature. A well drilled at location 1 confirmed this and is currently producing from a depth of 2,700 feet.

Figure 11:
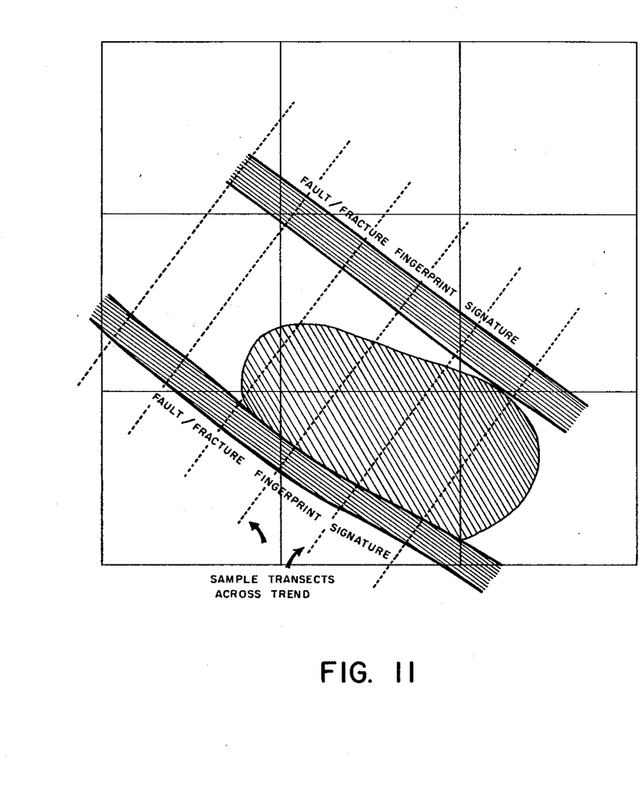
FIG. 11 is a map of areas of high similarity to petroleum in the subsurface as reservoired in a sandstone sealed by faulting and superimposed is an overlay of areas of characteristic fault/fracture leakage.

Offsetting by faults can provide a partial seal and impede petroleum migration. In this application, mapping of the fault/fracture signature provides the location of potential seals and mapping of high similarity values provides definitive data as to which side of the fault the petroleum reservoir is located. FIG. 11 is a composite map of this application in which sample lines were laid out perpendicular to the hypothesized trends in the area.

Figure 12:
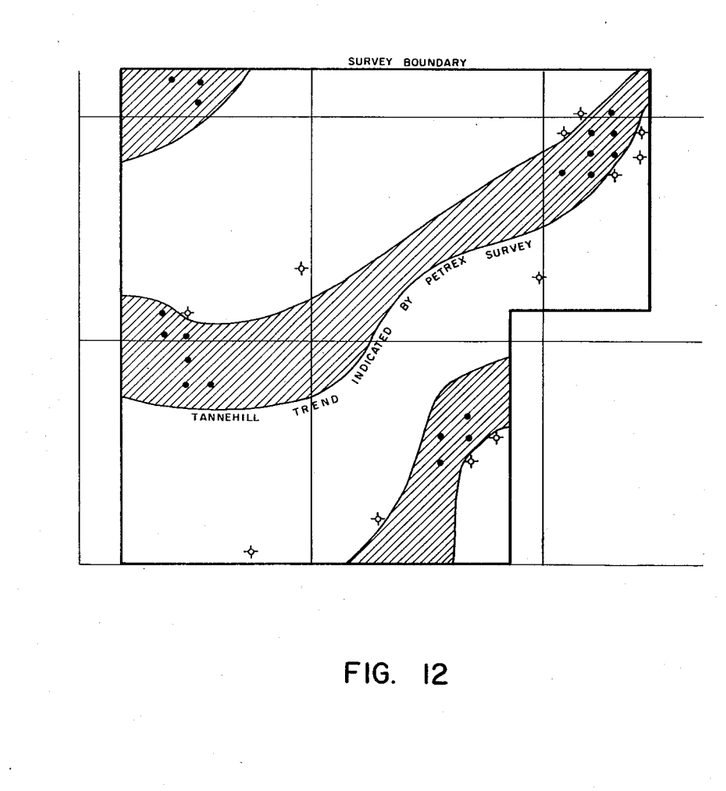
FIG. 12 is a map of areas of high similarity to petroleum in the subsurface as reservoired in a stratigraphic trap.

The present invention is capable of developing a discriminatory fingerprint in areas of very tight overlying cover with low volatile flux. No anomalous flux data was observed in a survey area of south Texas. Based on the flux data, the area would be considered of low potential. FIG. 12 is a similarity value map of this area in Texas where a stratigraphic petroleum trap occurs. The overlying materials are quite impermeable to volatile substances. In this area, oil production is from a depth of 3,000 feet. The fingerprint adequately defines the productive trend and is confirmed by four small oil fields and five newly drilled, productive wells.

Figure 13:
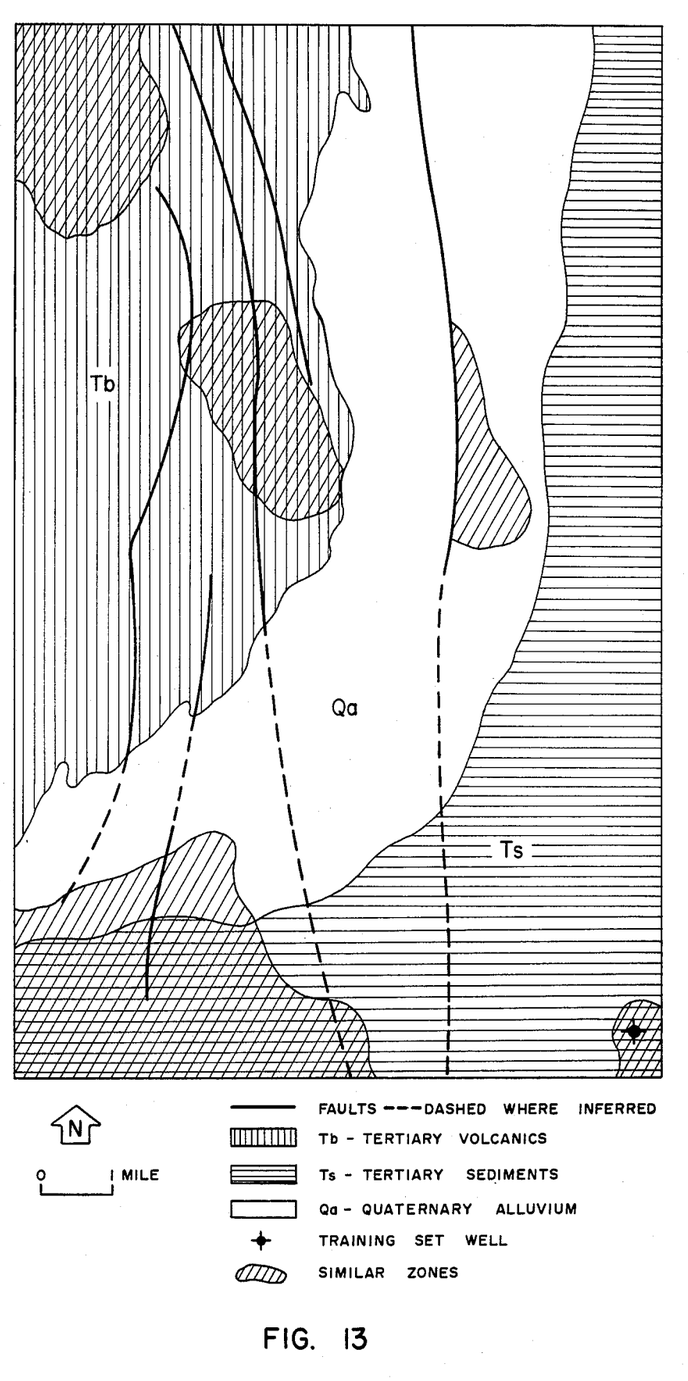
FIG. 13 is a map of areas of high similarity to petroleum in the subsurface reservoired in traps of unknown character and the map also demonstrates the collection and detection of the fingerprint through contrasting geologic cover.

Thick sequences of overlying materials do not prevent the fingerprint from being collected, analyzed, and interpreted. An area surveyed had a tertiary sedimentary sequence underlying the entire area. A thick layer of volcanics flowed over the area and in turn was cut by a river which also deposited alluvial materials. FIG. 13 is a similarity value map developed using the present invention and a training set around a shut-in well in the corner of the area. Zones of high similarity occur on all three surface materials. In addition, the vegetative cover on the volcanics is different than in the river valley, demonstrating that the fingerprint can be detected in survey areas of contrasting ground cover or agricultural utilization.

Figure 14:
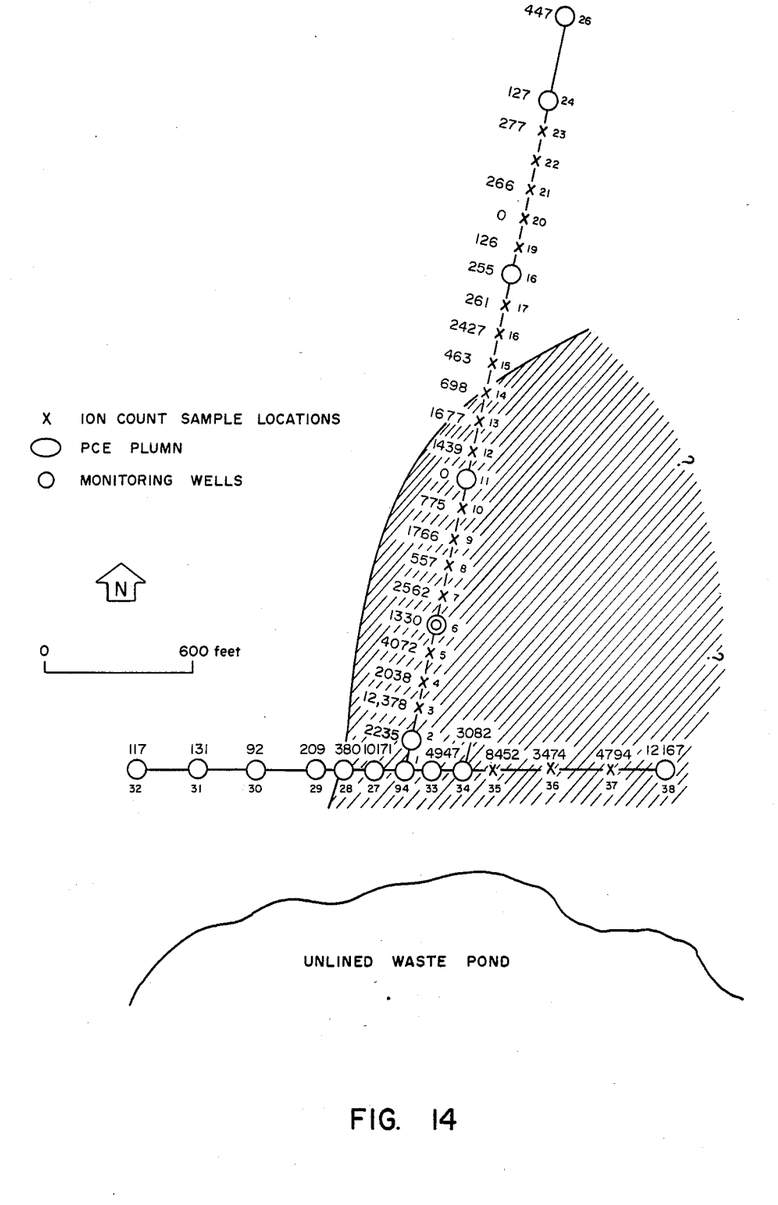
FIG. 14 is a map demonstrating the surface collection, detection and mapping of a man-made contaminant moving in the groundwater from an unlined waste disposal pond.

The present invention has application in mapping chemical wastes migrating in groundwater. A large, unlined waste pond had been receiving solvents containing polychlorinated ethylene (PCE) for a number of years. FIG. 14 maps the distribution or plume of the PCE-similar spectra in the direction of expected groundwater flow. This plume distribution is confirmed by groundwater analyses from the monitoring wells.

Figure 15:
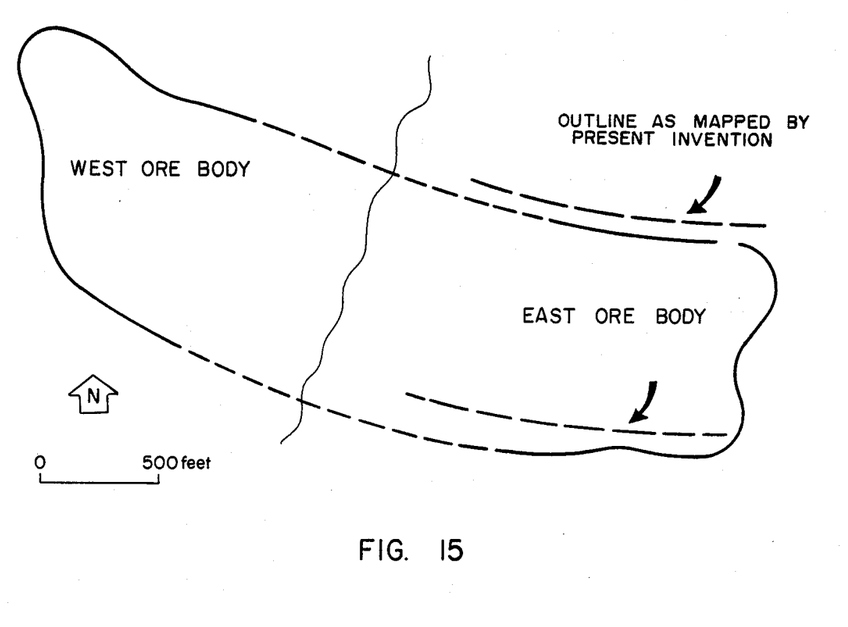
FIG. 15 is a map demonstrating the surface collection, detection and mapping of volatile substances from a gold deposit.

The application to metallic and non-metallic mineral exploration is demonstrated by the map of FIG. 15. The east portion of an epithermal gold ore body was surveyed using the described invention along a series of sample lines across the known ore occurrence. The position of the ore as determined by the present invention is shown as the dashed line.

By way of summation, therefore, the present invention includes a novel apparatus and method for inexpensively obtaining integrative samples of volatile substances associated with underground deposits wherein those volatile substances normally migrate to the surface of the earth. The apparatus is particularly advantageous since it is inexpensive to fabricate, simple to place in the earth and, more importantly, provides an accurate and reproducible sampling system. Multivariate statistics are employed to compare the plurality of volatile substances (fingerprint) from one location with the plurality of volatile substances (fingerprint) from another location. This comparison is mapped by this method in order to ascertain the possible presence of a subsurface body of economic interest.

The invention may be embodied in other specific forms without departing from its spirit or essential characteristics. The described embodiements are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of geochemical prospecting for volatile substances associated with or produced by underground deposits wherein said volatile substances normally migrate to the earth's surface, said method comprising:

preparing a plurality of shallow holes in the surface of the earth;

placing an integrative sample collector in each shallow hole, each integrative sample collector comprising an adsorbent to adsorb said volatile substances;

inverting a container over each integrative sample collector;

backfilling each shallow hole;

retaining the integrative sample collectors in the holes for a predetermibned time period to enable at least a portion of said volatile substances associated with underground deposit to be collected by said adsorbent;

removing said integrative sample collectors after said predetermined time period has elapsed;

analyzing a plurality of said volatile substances adsorbed on said adsorbent to obtain analytical data;

storing said analytical data on a computer;

objectively processing said analytical data by multivariate statistics so as to determine with some degree of confidence the nature of the underground deposit and calculating a similarity value based on the emanation of volatile substances from a known source comprising a known fingerprint; and mapping the distribution of similarity values to the known fingerprint so as to guide the exploration for the desired underground deposits.

2. The method defined in claim 1 wherein said placing step further comprises forming each of said integrative sample collectors as a ferromagnetic wire having said adsorbent bonded to one end thereof.

3. The method defined in claim 2 wherein said placing step further comprises mounting each of said ferromagnetic wire in a pedestal placed in said shallow hole, said ferromagnetic wire in a pedestal placed in said shallow hole, said pedestal supporting said ferromagnetic wire in spaced relationship to the earth in the shallow hole and the container inverted over the integrative sample collector.

4. The method defined in claim 2 wherein said placing step comprises mounting each of said ferromagnetic wire directly in the container.

5. The method defined in claim 2 wherein the placing step comprises forming each of said integrative sample collectors as a plurality of ferromagnetic wires each having a body of said adsorbent bonded to a respective end thereof, each ferromagnetic wire having a different length.

6. The method defined in claim 5 wherein said plurality of ferromagnetic wires have a plurality of adsorbents, each adsorbent being selected to collect and integrate a different set of volatile substances.

7. The method defined in claim 1 wherein the preparing step comprises forming said shallow holes in a predetermined pattern on the earth surface.

* * * * *